(12) United States Patent
Minor et al.

(10) Patent No.: US 9,658,893 B2
(45) Date of Patent: May 23, 2017

(54) MULTILAYERED RESOURCE SCHEDULING

(71) Applicant: Runtime Design Automation, Santa Clara, CA (US)

(72) Inventors: Jeremy Minor, Santa Cruz, CA (US); Stuart Taylor, San Jose, CA (US)

(73) Assignee: Runtime Design Automation, Santa Clara, CA (US)

( * ) Notice: Subject to any disclaimer, the term of this patent is extended or adjusted under 35 U.S.C. 154(b) by 82 days.

(21) Appl. No.: 14/705,703

(22) Filed: May 6, 2015

(65) Prior Publication Data
US 2016/0328269 A1 Nov. 10, 2016

(51) Int. Cl.
*G06F 9/46* (2006.01)
*G06F 9/50* (2006.01)

(52) U.S. Cl.
CPC ............ *G06F 9/505* (2013.01); *G06F 9/5038* (2013.01)

(58) Field of Classification Search
CPC ................. G06F 9/4881; G06F 9/5038; G06F 2209/5021; G06F 3/1263; G06F 9/4887
USPC .......................................................... 718/103
See application file for complete search history.

(56) References Cited

U.S. PATENT DOCUMENTS

| | | | | |
|---|---|---|---|---|
| 5,339,415 A * | 8/1994 | Strout, II | ............. | G06F 9/4881 718/102 |
| 6,108,683 A * | 8/2000 | Kamada | ................ | G06F 9/4881 718/102 |
| 6,434,589 B1 * | 8/2002 | Lin | ....................... | G06F 9/4881 718/104 |
| 7,263,695 B1 * | 8/2007 | Muzaffar | ................. | G06F 8/71 718/103 |
| 7,562,362 B1 * | 7/2009 | Paquette | ............... | G06F 9/4881 718/102 |
| 2002/0194248 A1 * | 12/2002 | Wood | .................... | G06F 9/5038 718/102 |
| 2003/0037091 A1 * | 2/2003 | Nishimura | ........... | G06F 9/4881 718/103 |

(Continued)

OTHER PUBLICATIONS

Lardieri et al. "A multi-layered resource management framework for dynamic resource management in enterprise DRE systems", 2007, Elsevier.*

(Continued)

*Primary Examiner* — Wei Zhen
*Assistant Examiner* — Junchun Wu
(74) *Attorney, Agent, or Firm* — Carr & Ferrell LLP

(57) ABSTRACT

Systems and methods for multilayered resource scheduling are provided. A system may include a user interface, an upper level scheduler, at least one lower level scheduler, and a reporting module. The user interface may receive a plurality of tasks. The upper level scheduler may sort the plurality of tasks into tasks with identical resource requirements. The lower level scheduler may be operable to receive resource requirements associated with a task. The lower level scheduler may ascertain compute resources sufficient to execute the task on a machine in a compute farm and advertise the compute resources as matching the resource requirements. The lower level scheduler may further receive a request to execute the task on the machine. The compute resources may be controlled to execute the tasks with the identical resource requirements without further scheduling operations. The lower level scheduler may control the compute resources to execute the task.

17 Claims, 9 Drawing Sheets

(56) References Cited

U.S. PATENT DOCUMENTS

| | | | | |
|---|---|---|---|---|
| 2007/0204337 A1* | 8/2007 | Schnackenberg | ..... | H04L 63/105 726/11 |
| 2009/0083746 A1* | 3/2009 | Katsumata | ............ | G06F 9/5027 718/103 |
| 2009/0150891 A1* | 6/2009 | Matsa | ................... | G06F 9/4881 718/103 |
| 2010/0257532 A1* | 10/2010 | Liang | .................... | G06F 9/5027 718/103 |
| 2011/0289507 A1* | 11/2011 | Khan | ...................... | G06F 8/451 718/104 |
| 2012/0110582 A1* | 5/2012 | Ferdous | .............. | G06F 11/3442 718/101 |
| 2013/0074088 A1* | 3/2013 | Purcell | .................. | G06F 9/4881 718/103 |
| 2013/0167152 A1* | 6/2013 | Jeong | ................... | G06F 9/4881 718/102 |
| 2013/0346993 A1* | 12/2013 | Chen | ..................... | G06F 9/5072 718/103 |
| 2014/0143790 A1* | 5/2014 | Kurihara | ............... | G06F 9/4881 718/105 |

OTHER PUBLICATIONS

Davis et al. "Improved Priority Assignment for Global Fixed Priority Pre-emptive Scheduling in Multiprocessor Real-Time Systems", Sep. 22, 2010, Springer Science.*

Munawar et al. "A Multilevel, Control-Theoretic Framework for Integration of Planning, Scheduling, and Rescheduling", Apr. 23, 2005, American Chemical Society.*

Chunlin et al., "Multi-level scheduling for global optimization in grid computing", 2007, Elsevier.*

\* cited by examiner

MULTILAYERED RESOURCE SCHEDULING

TECHNICAL FIELD

The present disclosure relates generally to data processing and, more particularly, to methods and systems for delivering workload scheduling in distributed networks.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Workloads for distributed computer networks typically include many separate tasks, also referred to as jobs. Each job may have a set of resource requirements for the job to be successfully executed. In order to efficiently dispatch a workload to a distributed compute farm, a coherent global view of both the workload and the current state of the compute nodes may be needed. A compute farm may include a collection of computer servers, usually maintained to accomplish server needs beyond the capability of a single machine. Having all the information available to a single entity allows that entity, sometimes referred to as a batch-processing master, to schedule jobs as resources free up. Such an approach ensures that a job is always scheduled as soon as the resources are available and policies permit.

Alternative systems are possible where multiple peer agents collectively determine when and where jobs can be submitted. In practice, such systems are difficult to manage due to the complexity and the lack of a single coherent view of the state of resources and jobs.

Conventionally, commercial products use a single job scheduler approach. However, the single job scheduler approach may face scalability problems. A single job scheduler needs to handle all job submissions, client queries, resource tracking, and job scheduling. The single job scheduler can be characterized by the number of jobs per second that the single job scheduler can handle. The number of jobs per second of the single job scheduler may depend on the number of entities (hosts or slaves) in the compute farm and the number of user queries concerning jobs and compute farm state. Eventually the single job scheduler may not be able to manage job scheduling, and resources may become idle for a longer time while jobs may be waiting to be dispatched. The remedy to such lack of scalability of the single job scheduler may include partitioning the compute farm into two or more segments, each with its own separate scheduler. However, such partitioning may inevitably lead to wasting resources since a job submitted to one segment of the compute farm cannot run on the other even if resources are available.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for multilayered resource scheduling. An example system for multilayered resource scheduling may include a user interface, an upper level scheduler, at least one lower level scheduler, and at least one reporting module. The user interface may be operable to receive a plurality of tasks. The upper level scheduler may be operable to sort the plurality of tasks into tasks with identical resource requirements. The at least one lower level scheduler may be operable to receive resource requirements associated with a task. The at least one lower level scheduler may ascertain compute resources sufficient to execute the task on a machine in a compute farm and advertise the compute resources as matching the resource requirements. The at least one lower level scheduler may be further operable to receive a request to execute the task on the machine. The compute resources may be controlled to execute the tasks with the identical resource requirements without further scheduling operations. The at least one lower level scheduler may be operable to control the compute resources to execute the task. The at least one reporting module may be operable to provide a global view of compute resources to the user interface.

Also provided is a method for multilayered resource scheduling. The method may commence with receiving, by a user interface, a plurality of tasks. An upper level scheduler may sort the plurality of tasks into tasks with identical resource requirements. The method may further include receiving resource requirements associated with a task. The resource requirements may be received by at least one lower level scheduler from the upper level scheduler. The at least one lower level scheduler may ascertain compute resources sufficient to execute the task on a machine in a compute farm. The compute resources may be advertised as matching the resource requirements. Furthermore, the method may include receiving a request to execute the task on the machine. The compute resources may be controlled to execute the tasks with the identical resource requirements without further scheduling operations. The at least one lower level scheduler may control the compute resources to execute the task. The method may further include providing a global view of compute resources to the user interface.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
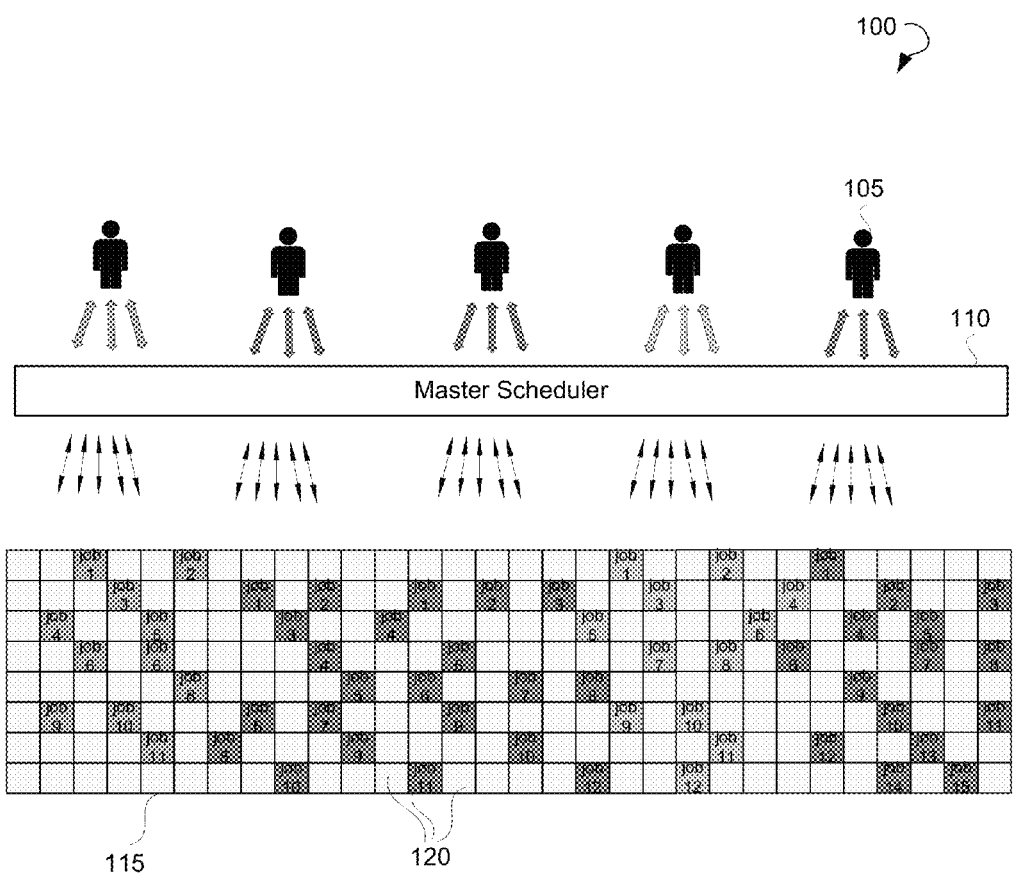
FIG. 1 shows a conventional environment for scheduling resources in a distributed network.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

This disclosure provides methods and systems for multi-layered resource scheduling. An example system may have multiple layers of schedulers such as an upper level scheduler and at least one lower level scheduler. The upper level scheduler may be associated with a user interface and may handle task submissions; specifically, the upper level scheduler may accept tasks via the user interface and perform task reporting. The system may include multiple upper level schedulers on top of one lower level scheduler. As additional upper level schedulers are added, more capacity to handle task submissions and task reporting may be created. After tasks are submitted to the upper level scheduler, the upper level scheduler may analyze the tasks and sort the tasks according to resource requirements of each of the tasks. The tasks having identical resource requirements may be grouped together. In other words, all tasks in a group may have the identical resource requirements. Upon grouping the tasks, the upper level scheduler may send a resource demand request to the lower level scheduler. The resource demand request may contain the resource requirements required to execute the tasks of the group of tasks.

The lower level scheduler may have complete visibility of the compute resources controlled by the lower level scheduler. The lower level scheduler may select compute resources sufficient to execute the task. In fact, the selected compute resources may be equal to or greater than the required compute resources. The lower level scheduler may respond to the resource demand request received from the upper level scheduler. The response may include advertising the selected compute resources to the upper level scheduler as the compute resources matching the requested resource requirements. On receipt of the advertised resources from the lower level scheduler, the upper level scheduler may generate a request to execute the task. Thereafter, the upper level scheduler may send the task to the selected compute resources. The lower level scheduler may control the compute resources to execute the tasks with the identical resource requirements without further scheduling operations. Thus, all further tasks of the same group of tasks may be executed by the same compute resources without further scheduling by the lower level scheduler.

FIG. 1 shows a conventional environment 100 for scheduling resources in a distributed network. The conventional environment 100 may include a plurality of users 105, a master scheduler 110, and a grid 115. The grid 115 may include a collection of compute resources 120 from multiple locations operable to work together to perform a number of jobs. The compute resources 120 may constitute a compute farm. Each of the compute resources 120 may be set to perform a different task (shown as jobs 1-15) or application. The plurality of users 105 may include an entity, an enterprise, or any other user requesting performance of tasks, such as, for example, computing tasks.

The master scheduler 110 may be responsible for simultaneous handling of task submissions, user queries, resource tracking, and job scheduling. Therefore, upon receipt of a task from the plurality of users 105, the master scheduler 110 may analyze the task to determine resource requirements associated with the task. Based on the resource requirements, the master scheduler 110 may select one or more compute resources 120 that match the resource requirements of the task and schedule the task to be processed by the selected compute resources 120. However, the master scheduler 110 may not be able to duly perform all operations for which the master scheduler 110 is responsible and, therefore, some of the compute resources 120 may idle while tasks are waiting to be scheduled.

Figure 2:
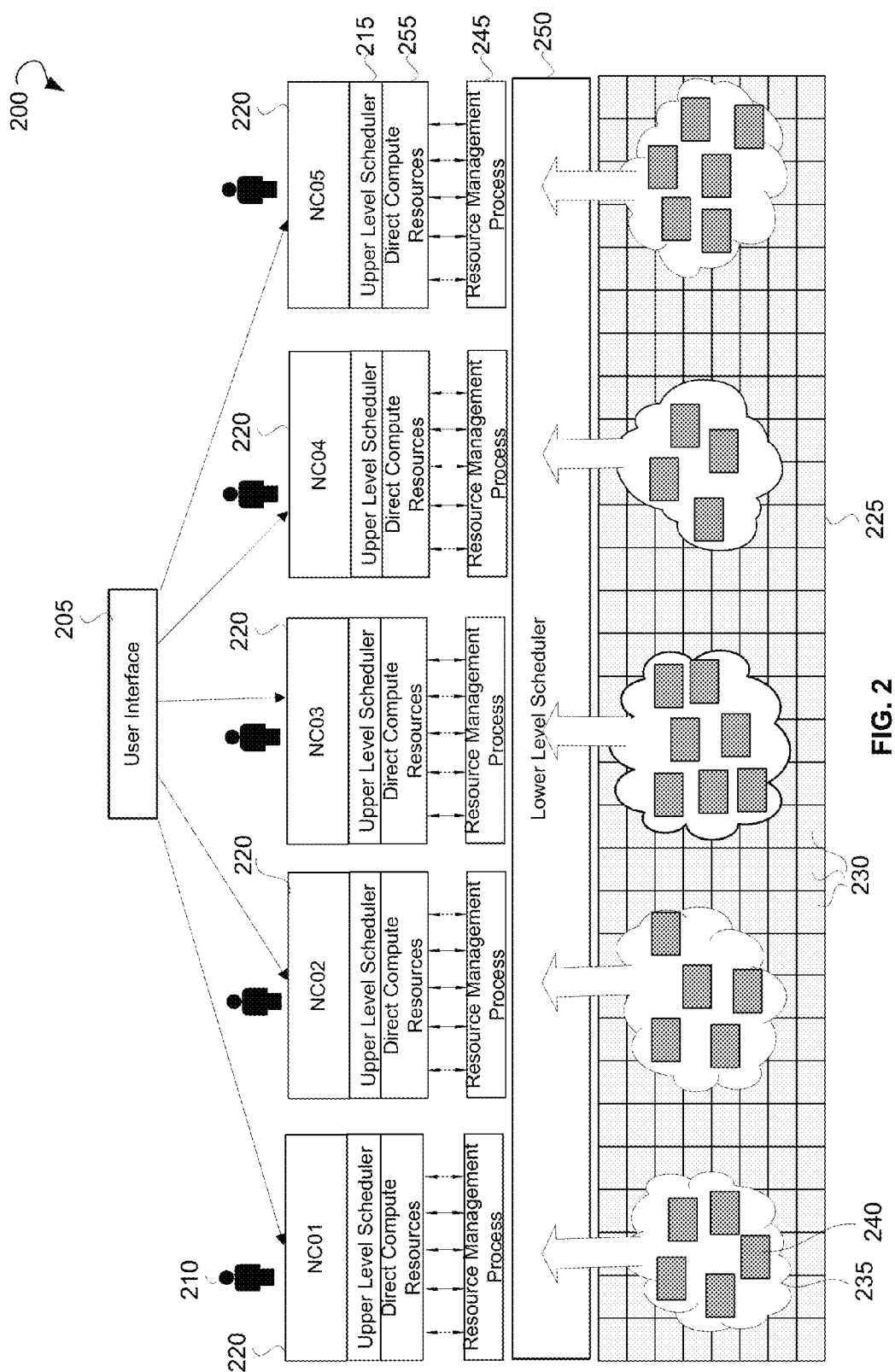
FIG. 2 illustrates an environment within which systems and methods for multilayered resource scheduling can be implemented.

FIG. 2 illustrates an environment 200 within which systems and methods for multilayered resource scheduling can be implemented, in accordance with some embodiments. The environment 200 may be a virtualized environment in a distributed network (not shown). The environment 200 may include an upper level scheduler 215. In some embodiments, a plurality of upper level schedulers potentially running on multiple machines may be provided. The upper level scheduler 215 may be user facing and may handle task submissions by accepting tasks from users 210 via a user interface 205. The upper level scheduler 215 may analyze the accepted tasks to determine resource requirements associated with each of the tasks. The environment 200 may include a plurality of computers connected to the distributed network, shown as network computers 220, each being associated with the upper level scheduler 215. Direct compute resources 255 may be attached to the upper level scheduler 215. A lower level scheduler 250 may run on a single networked computer. In example embodiments, the tasks can be submitted by the users 210 via a user interface 205 directly to the lower level scheduler 250, as both levels of schedulers behave in the same way.

The environment 200 may further include a grid 225, which may contain a collection of compute resources 230 from multiple locations operable to work together to perform a number of tasks. The compute resources 230 may constitute a compute farm. Each of the compute resources 230 may be set to perform a different task or application.

The upper level scheduler 215 may report the resource requirements associated with the task to the lower level scheduler 250. In an example embodiment, the lower level scheduler 250 has complete visibility of the compute resources 230 using its own internal accounting and via monitoring processes running on compute resources 230 of the grid 225. Based on resource requirements reported by the upper level scheduler 215, a resource management process 245 associated with the upper level scheduler 215 may request a subset of compute resources 240, which have identical resource requirements as identified by the upper level scheduler 215. Once granted by the lower level scheduler 250, the request may result in forming a temporary but dedicated (namely dedicated to the upper level scheduler 215 in need of these resources) set of resources to form carved-out resource sets 235. Therefore, once the compute resources 230 are allocated to the upper level scheduler 215, the compute resources 230 form the subset of compute resources 240. Therefore, the compute resources 230 may not be partitioned for performing tasks, but, instead, grouped into the resource sets 235 based on the requested resource requirements and may change dynamically. Thus, if a task is waiting, the task may be scheduled immediately as soon as the compute resources 240 are available, and predetermined policies permit. The predetermined policies may include policies concerning compute resource allocation and use.

Figure 3:
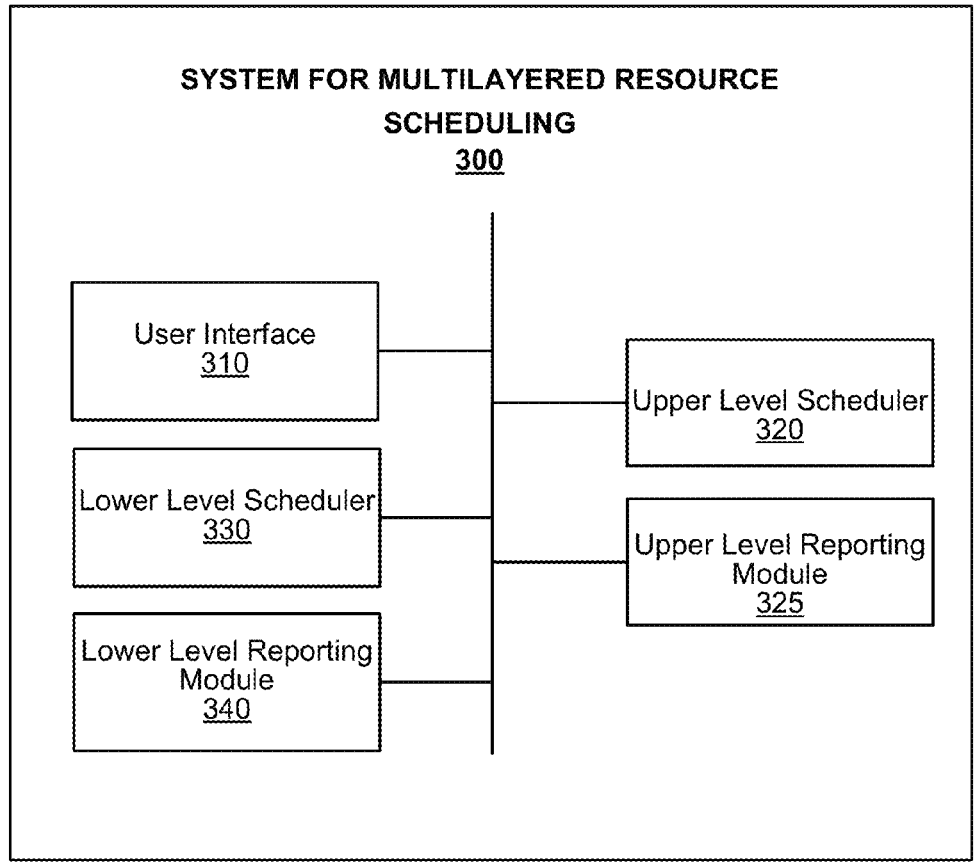
FIG. 3 is a block diagram showing various modules of a system for multilayered resource scheduling.

FIG. 3 is a block diagram showing various modules of a system 300 for multilayered resource scheduling, in accordance with certain embodiments. The system 300 may comprise a user interface 310, an upper level scheduler 320, a lower level scheduler 330, an upper level reporting module 325, and a lower level reporting module 340. The user interface 310 may be operable to receive a plurality of tasks. The tasks may be received from a plurality of entities, organizations, users, and so forth. The upper level scheduler 320 may be operable to sort the plurality of tasks into tasks with the identical resource requirements.

The lower level scheduler 330 may be communicatively coupled to the upper level scheduler 320. In an example embodiment, the lower level scheduler 330 may include a plurality of lower level schedulers. The lower level scheduler 330 may be operable to receive resource requirements associated with a task. The resource requirements may be received from the upper level scheduler 320. In an example embodiment, the plurality of tasks may be received directly by the lower level scheduler 330 without modifications of the plurality of tasks.

The lower level scheduler 330 may be further operable to ascertain compute resources sufficient to execute the task on a machine in a compute farm. In an example embodiment, the compute resources include at least one of the following: a number of central processing units (CPUs), an amount of memory, and the like. In some embodiments, the ascertaining of the compute resources may be further based on preexisting policies.

The lower level scheduler 330 may be operable to advertise the compute resources as matching the resource requirements. Furthermore, the at least one lower level scheduler may be operable to make the compute resources available in response to a demand by the upper level scheduler 320. Therefore, the upper level scheduler 320 may be aware of a subset of underlying compute resources, whereas the lower level scheduler 330 may be aware of full compute resources. The underlying compute resources may include resources advertised by the lower level scheduler to the upper level scheduler.

The lower level scheduler 330 may include a master scheduler process and a resource management process corresponding to each machine in the compute farm under control of the lower level scheduler 330. The compute resources matching the resource requirements may be advertised to the upper level scheduler 320 by the resource management process.

For example, for a machine having 8 CPUs and 128 gigabytes of random access memory (RAM), the resource management process can report that the compute resources of 8 CPUs and 128 gigabytes of RAM are available. A task having the resource requirement of 2 CPUs and 64 gigabytes of RAM may be able to run on the machine, while 6 CPUs and 64 gigabytes of RAM may be left free for other tasks. It can be possible to configure the resource management process to report a different resource amount available (for example, 6 CPUs and 64 gigabytes of RAM). Whatever resources the resource management process reports, the master scheduler process can assume these resources to be baseline (before the tasks are submitted) resources. The compute resources of the lower level scheduler 330 can grow (or shrink) as machines are added (or taken away) from the compute farm.

The lower level scheduler 330 may receive a request to execute the task on the machine. The compute resources may be controlled to execute the tasks with the identical resource requirements without further scheduling operations. The lower level scheduler 330 may be operable to control the compute resources to execute the task.

In an example embodiment, a proxy encapsulating the tasks with the identical resource requirements may be created. All further tasks having the identical resource requirement may be directed to the proxy. Therefore, the further tasks having the identical resource requirements may be received by compute resources but now without the direct control of the lower level scheduler 330. The proxy enables temporary direct access of the upper level scheduler 320 to the underlying compute resources.

The lower level reporting module 340 may be operable to provide a global view of the compute resources to the user interface 310 and the usage of the compute resources by a proxy task (tasks having identical resource requirements may be grouped into a proxy task). However, the lower level reporting module 340 may lack the ability to see individual tasks. In contrast, the upper level reporting module 325 may only see the compute resources being consumed by the upper level scheduler 320 (not the global view) and may see the individual tasks contained in the proxy task. Therefore, because the individual tasks are not hidden, task dependencies and separate task statuses can be maintained.

The system 300 may further include a mitigation mechanism to schedule priority tasks. The mitigation mechanism may be operable to stop accepting the tasks with the identical resource requirements after a predetermined period of time to allow the lower level scheduler 330 to schedule tasks associated with different resource requirements.

Additionally or alternatively, the system 300 may include another mitigation mechanism to instruct the upper level scheduler 320 to stop sending the tasks with the identical resource requirements after a current task is executed to allow execution of higher priority tasks.

In some example embodiments, the upper level scheduler 320 may act as a private scheduler. The private scheduler may be operable to manage tasks associated with a single entity. The private scheduler can be used by an individual or a team, and only tasks submitted by the individual or the team can be present in the private scheduler. For example, an individual may want to run a computationally expensive task report every few seconds. In a shared upper level scheduler, such a task may impact other entities that use the same upper level scheduler and slow down the ability of the entities to submit other tasks. In a further example embodiment, an individual may want to keep the status of tasks in a system for many days or weeks, such as to track runtimes and task success rates. In a shared upper level scheduler, this requirement can consume valuable memory and/or slow down the upper level scheduler. Additionally, the shared upper level schedulers may often require task data to be purged within a predefined time period.

In an example embodiment, the upper level scheduler 320 may also include a master scheduler process identical to the master scheduler process of the lower level scheduler 330, but with a slightly different configuration (e.g. the names of the two schedulers may be different). Additional differences may be in the treatment of resource management processes. The upper level scheduler 320 may not have its own compute resources to manage and, therefore, no resource management processes may be present.

When the tasks are submitted to the upper level scheduler 320, the upper level scheduler 320 may assess resource requirements of each task. The upper level scheduler may place the tasks having identical resource requirements into a single group, also referred to as a "task bucket." The upper level scheduler 320 may include a group management process responsible for monitoring the task buckets. When a waiting task is notified by the group management process, the group management process may create, subject to predetermined policies, a proxy for the waiting task, where the proxy may be associated with exactly the same resource requirements as the resource requirements of the waiting task. The proxy, in fact, may be a resource management process operable to advertise the same compute resources as requested. For example, the upper level scheduler 320 may receive a task requesting 4 CPUs and 12 gigabytes of RAM. This may result in submitting the task to the proxy also requesting 4 CPUs and 12 gigabytes of RAM. When the task is scheduled to run by the lower level scheduler 330 (perhaps on a machine having 12 CPUs and 256 gigabytes), the resource management process may connect back to the upper level scheduler 320 and declare itself as a compute resource having 4 CPUs and 12 gigabytes of RAM. The upper level scheduler 320 may now see these compute resources and issue the original task from the task bucket, each task of which requires the compute resources of 4 CPUs and 12 gigabytes of RAM.

Figure 4:
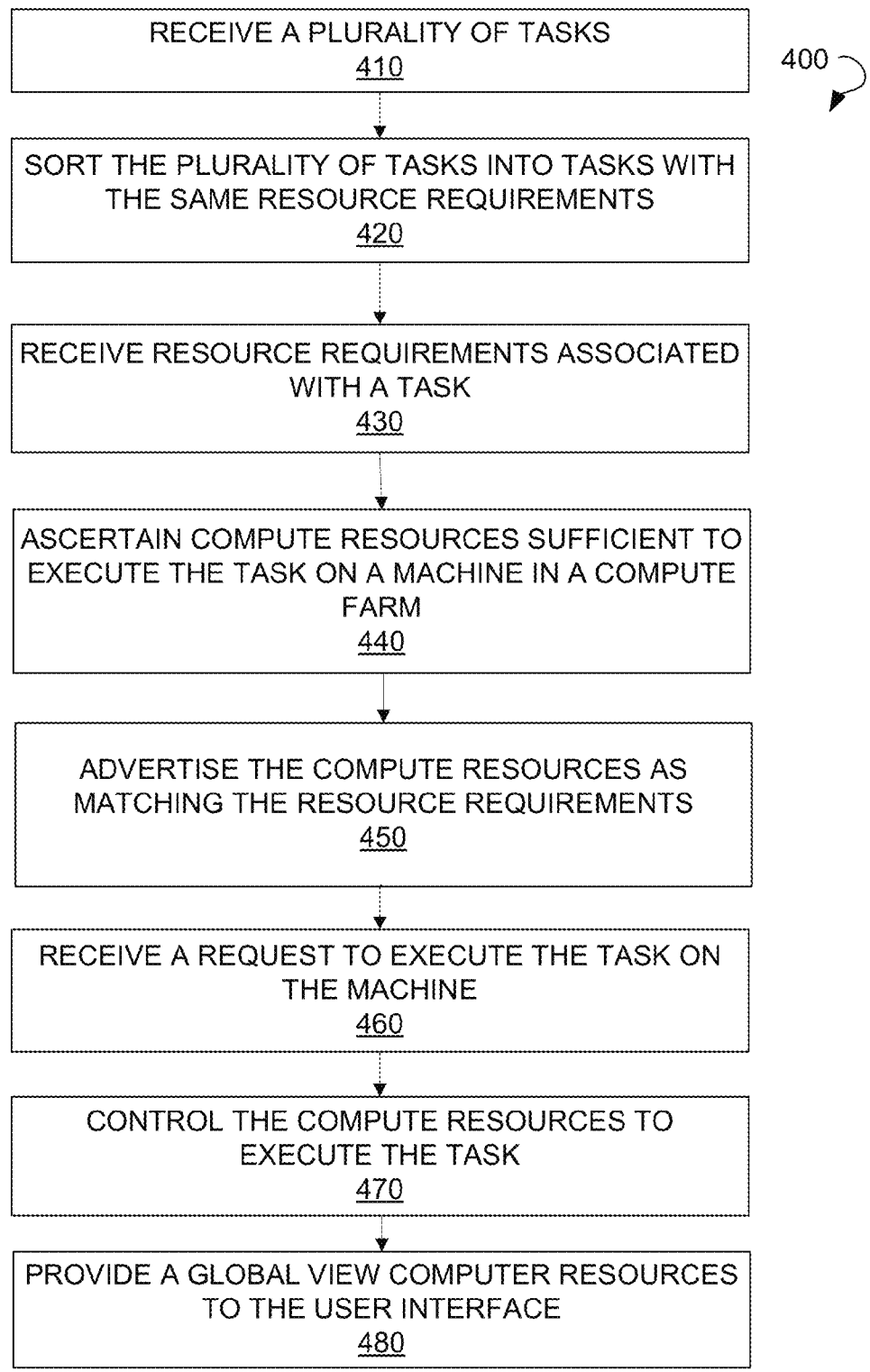
FIG. 4 is a flow chart illustrating a method for multilayered resource scheduling.

FIG. 4 is a flow chart illustrating a method 400 for multilayered resource scheduling, in accordance with some example embodiments. The method 400 may commence with receiving, by a user interface, a plurality of tasks at operation 410. At operation 420, the plurality of tasks may be sorted into tasks with the identical resource requirements. The sorting may be performed by an upper level scheduler.

The method 400 may further include receiving, by at least one lower level scheduler, resource requirements associated with a task at operation 430. Upon receiving the resource requirements, the at least one lower level scheduler may ascertain compute resources sufficient to execute the task on a machine in a compute farm at operation 440.

At operation 450, the at least one lower level scheduler may advertise the compute resources as matching the resource requirements. The at least one lower level scheduler may advertise the compute resources to the upper level scheduler. In example embodiments, the method 400 may optionally include making the compute resources available in response to a demand by the upper level scheduler.

The method 400 may further include receiving a request to execute the task on the machine at operation 460. The compute resources may be controlled to execute the tasks with the identical resource requirements without further scheduling operations. At operation 470, the compute resources may be controlled by the at least one lower level scheduler to execute the task.

The method 400 may further include providing a global view of compute resources to the user interface at operation 480 by at least one reporting module.

In an example embodiment, the method 400 may further include receiving further tasks of the plurality of tasks. The further tasks may be received via a proxy. As the plurality of tasks may include tasks having the identical resource requirements, all further tasks may have the identical resource requirements. The proxy may encapsulate the tasks with the identical resource requirements.

In an example embodiment, the method 400 may further include scheduling of priority tasks. The priority tasks may be scheduled by a mitigation mechanism associated with the proxy. More specifically, the mitigation mechanism may be operable to stop accepting the tasks with the identical resource requirements by the proxy after a predetermined period of time to allow the lower level scheduler to schedule tasks associated with different resource requirements.

Additionally, the method 400 may further include instructing the upper level scheduler to stop sending the tasks with the identical resource requirements after a current task is executed to allow execution of higher priority tasks. The instructing may be performed by another mitigation mechanism associated with the proxy.

In further example embodiments, the method 400 may include receiving the plurality of tasks directly by the at least one lower level scheduler without modifications of the plurality of tasks. Furthermore, the method 400 may include managing tasks associated with a single entity by the upper level scheduler. In such a case, the upper level scheduler may act as a private scheduler responsible for scheduling the tasks of a single entity.

Figure 5:
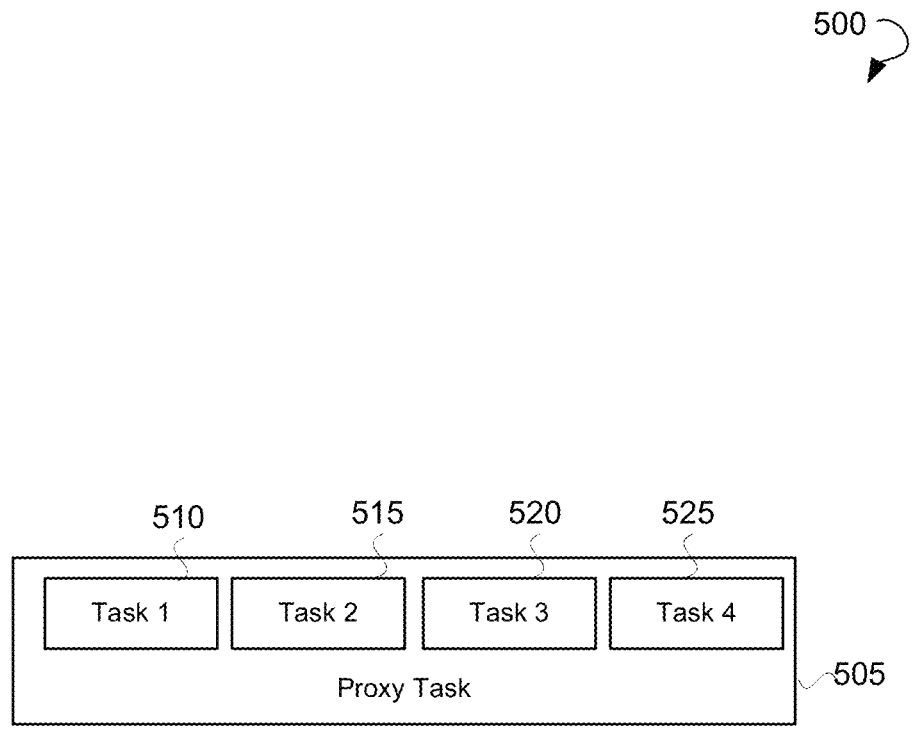
FIG. 5 shows a schematic diagram of encapsulation of tasks by a proxy.

FIG. 5 shows a schematic diagram 500 of encapsulation of tasks by a proxy. The upper level scheduler (not shown) may be aware of a number of compute resources that are precisely matched with resource requirements of the tasks submitted to the upper level scheduler and waiting for execution. The lower level scheduler (not shown) may be aware of the resource requirements needed for the execution of tasks, but not the actual tasks themselves. The upper level scheduler may create a proxy, to which tasks 510, 515, 520, and 525 having identical resource requirements may be forwarded. The tasks 510, 515, 520, and 525 may be grouped into a chained task, also referred to as a proxy task 505. The proxy task 505 may act as a container or envelope for the tasks 510, 515, 520, and 525.

Thus, the lower level scheduler may be released from handling reporting resource requirements. However, there may be no apparent release of the task scheduling function if every task merely results in the creation of a proxy. Typically, large workloads include many tasks with a few distinct resource requirements. Therefore, a workload of one million tasks may only have, for example, five different resource requirements. This means that a proxy can be re-used for different tasks. For example, a thousand thirty second tasks can be run sequentially on a single proxy. The upper level scheduler may be aware of a thousand separate short tasks, while the lower level scheduler may be aware of a single five hundred minute task. Therefore, there may be a 1000:1 reduction in load for the lower level scheduler.

Figure 6:
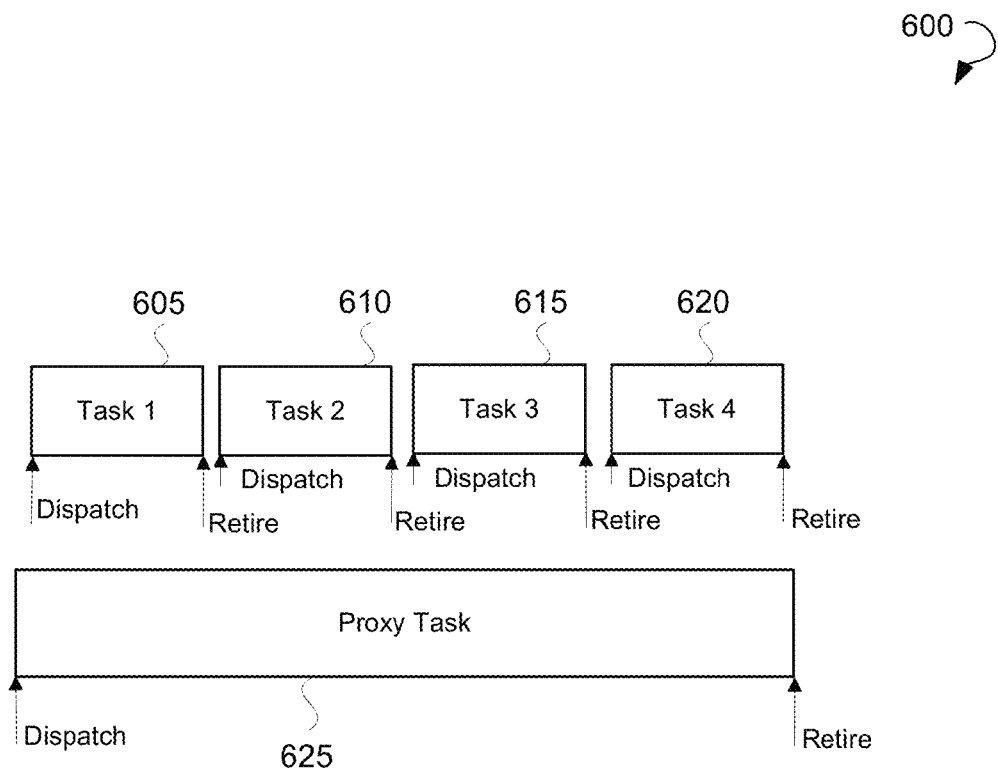
FIG. 6 shows a schematic diagram of reduction in task processing events seen by a lower level scheduler.

FIG. 6 shows a schematic diagram 600 illustrating reduction in task processing events seen by a lower level scheduler. The upper level scheduler (not shown) may see tasks 605, 610, 615, and 620, and eight task events may be processed, in particular, dispatching and retiring each of tasks 605, 610, 615, and 620. At the same time, the tasks 605, 610, 615, and 620 can be chained together into a proxy task 625 run on the proxy (not shown). The lower level scheduler (not shown) may see only one task, namely the proxy task 625. As a result, only two task events may need to be processed, namely dispatching and retiring of the proxy task 625.

The upper level scheduler may have full visibility of the individual tasks, and tasks that fail can be selectively retried. At the same time, the workload may remain unchanged; for example, the upper level scheduler may have a thousand visible tasks, each with its own status. From the task perspective, there may be no difference if the workload was submitted to either the upper level scheduler or the lower level one. The difference may be in what the upper level scheduler and the lower level scheduler see in terms of compute resources. In particular, the upper level scheduler may see a subset of the underlying compute resources (dynamically created depending upon the resource requirements requested by the upper level scheduler), whereas the lower level scheduler may see the full compute resources.

An unwanted effect of chaining tasks through the proxies may include less responsiveness of the underlying compute farm to changes in demand. Having fewer but longer running tasks may result in the upper level scheduler having fewer opportunities to schedule potentially more important (or deserving) tasks. Two mechanisms may be available to mitigate this unwanted effect. To overcome such obstacles, the proxies can be operable to not accept any more tasks after a certain period of time, also referred to as a proxy lifetime. After the proxy lifetime, a new proxy can be required. At the same time, the lower level scheduler may have an opportunity to schedule a proxy task along with potentially more important tasks. The proxy lifetime may enable a tradeoff to be made between a load and responsiveness of the upper level scheduler.

Figure 7:
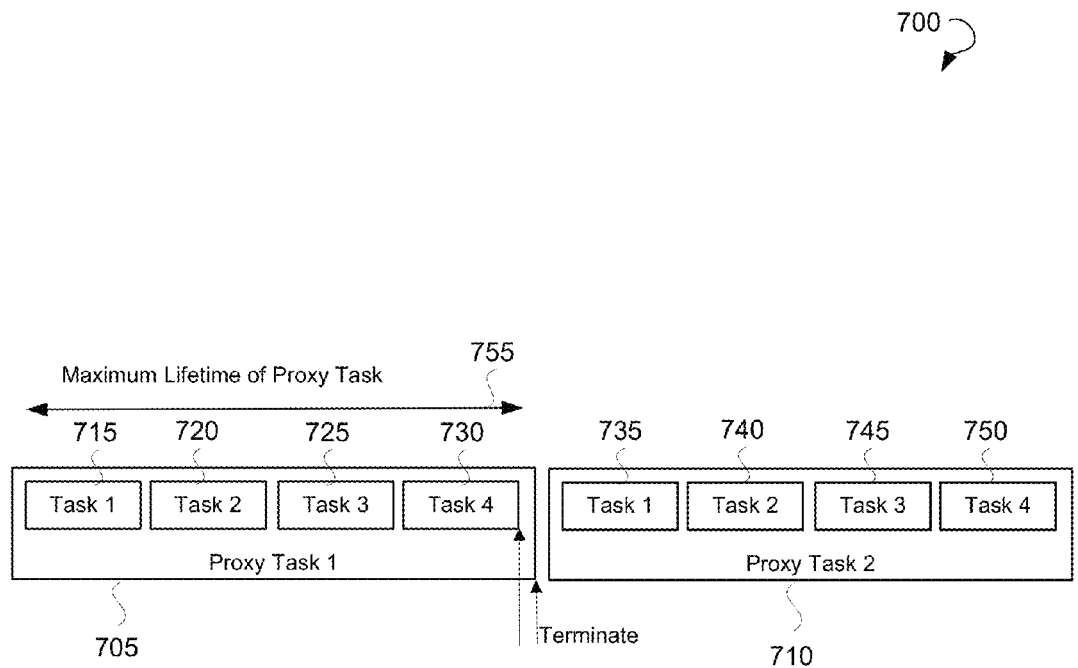
FIG. 7 shows a schematic diagram of time slicing of compute resources.

FIG. 7 shows a schematic diagram 700 of time slicing of compute resources. A compute resource (not shown) may be running one proxy task (shown as a proxy task 705) or more proxy tasks with other proxy tasks (shown as a proxy task 710) waiting for execution. Each of the proxy tasks 705, 710 may include a number of tasks, such as tasks 715, 720, 725, and 730 of the proxy task 705 and tasks 735, 740, 745, and 750 of the proxy task 710, and the actual assignment of tasks 715-750 to proxy tasks 705, 710 is done dynamically. Each of the proxy tasks 705, 710 may have a proxy lifetime 755, during which tasks 715, 720, 725, and 730 and tasks 735, 740, 745, and 750 can be sent to each of the proxy tasks 705, 710 respectively. Upon expiration of the proxy lifetime 755, the proxy task 705 may be terminated; thus, no further tasks can be added to the proxy task 705.

In another example embodiment, the upper level scheduler can be told by the lower level scheduler that the upper level scheduler needs to terminate the proxy as soon as the current task that is running on the proxy has terminated. The proxy task can be terminated on a task boundary to avoid the difficulties of halting and restarting the task.

Figure 8:
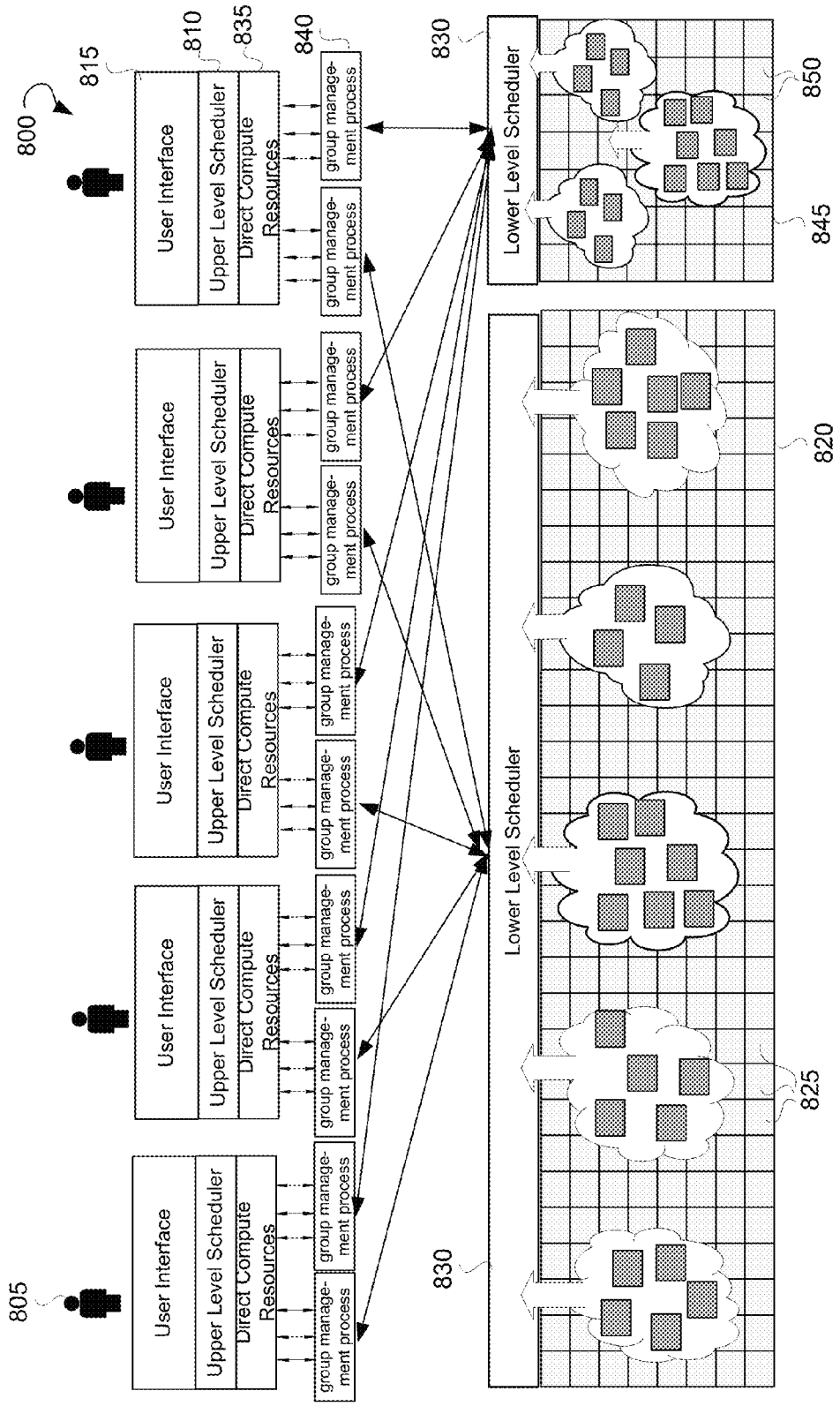
FIG. 8 illustrates an environment within which systems and methods for multilayered resource scheduling with multiple lower level schedulers can be implemented.

FIG. 8 illustrates an environment 800 within which systems and methods for multilayered resource scheduling with multiple lower level schedulers can be implemented, in accordance with some embodiments. The environment 800 may include a plurality of upper level schedulers 810. The upper level schedulers 810 may receive tasks from users 805 via user interfaces 815. The environment 800 may include a plurality of user interfaces 815, with each being associated with one of the upper level schedulers 810.

The environment 800 may further include a grid 820, which may include the collection of compute resources 825 from multiple locations operable to work together to perform a number of tasks. The compute resources 825 may constitute a compute farm. The compute resources 825 may be controlled by lower level schedulers 830. The multiple upper level schedulers 810 may be associated with the user interfaces 815. Based on resource requirements associated with received tasks, the upper level schedulers 810 may select direct compute resources 835, which may have the same resource requirements as required for the received tasks. The received tasks may include proxy tasks (chained tasks having identical resource requirements). The upper level schedulers 810 may control the direct compute resources 835 and execution of the proxy tasks using a group management process 840.

Additionally, the upper level schedulers 810 may be connected to a team grid 845 including a number of compute resources 850 combined into a team compute farm. The team compute farm may include specific or private compute resources added to the lower level scheduler 830, which allow tasks sent to the lower level scheduler 830 to use a mix of specific or private compute resources and the compute resources provided by the upper level schedulers 810.

Figure 9:
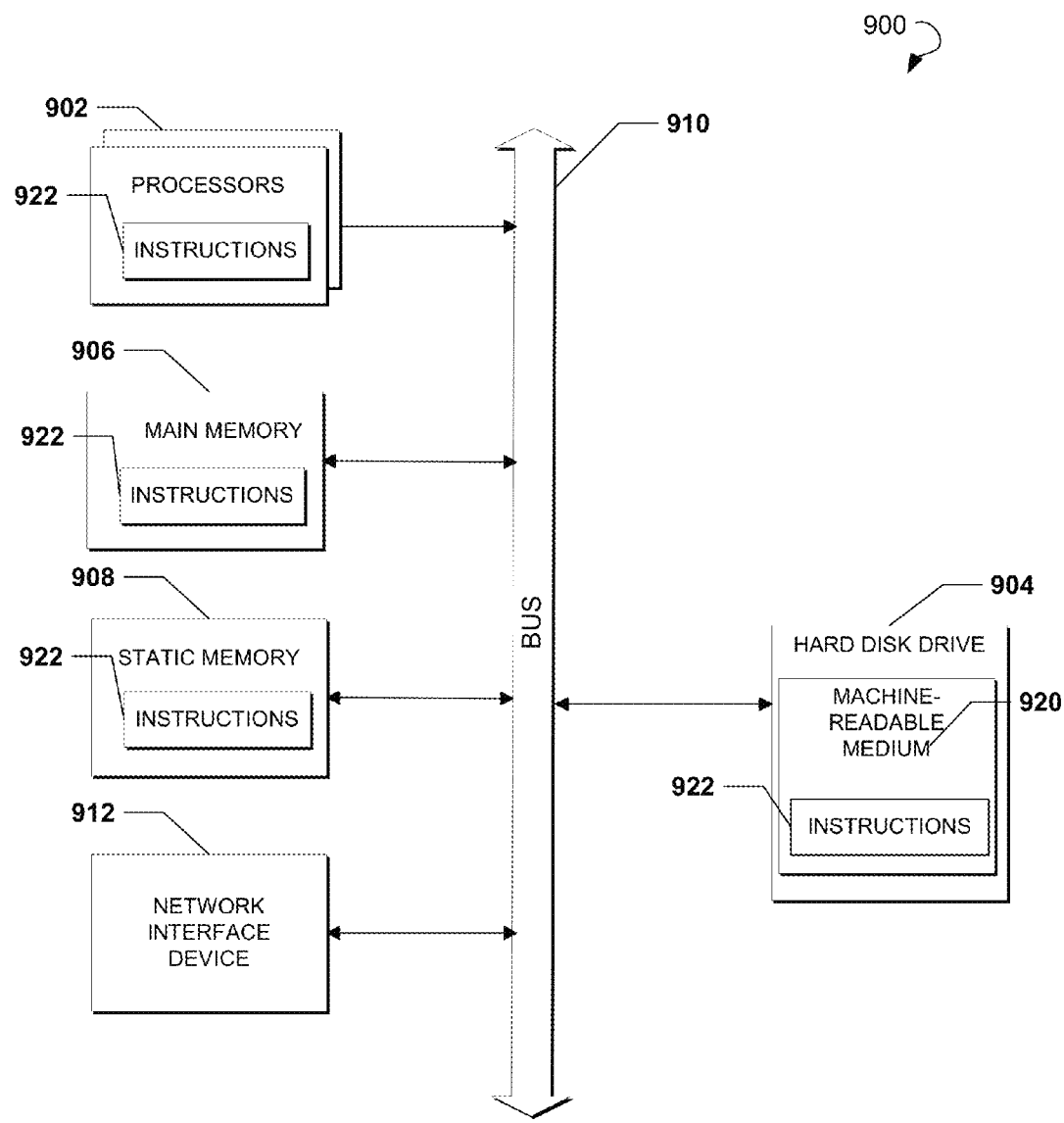
FIG. 9 shows a diagrammatic representation of a computing device for a machine in the exemplary electronic form of a computer system, within which a set of instructions for causing the machine to perform any one or more of the methodologies discussed herein can be executed.

FIG. 9 shows a diagrammatic representation of a computing device for a machine in the exemplary electronic form of a computer system 900, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 900 includes a processor or multiple processors 902, a hard disk drive 904, a main memory 906, and a static memory 908, which communicate with each other via a bus 910. The computer system 900 may also include a network interface device 912. The hard disk drive 904 may include a computer-readable medium 920, which stores one or more sets of instructions 922 embodying or utilized by any one or more of the methodologies or functions described herein. The instructions 922 can also reside, completely or at least partially, within the main memory 906 and/or within the processors 902 during execution thereof by the computer system 900. The main memory 906 and the processors 902 also constitute machine-readable media.

While the computer-readable medium 920 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, read only memory, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Python, JavaScript, Go, or other compilers, assemblers, interpreters or other computer languages or platforms.

Thus, systems and methods for multilayered resource scheduling are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for multilayered resource scheduling, the system comprising:
   a user interface to receive a plurality of tasks;
   an upper level scheduler operable to sort the plurality of tasks into tasks with identical resource requirements;
   at least one lower level scheduler communicatively coupled to the upper level scheduler, the at least one lower level scheduler being operable to:
   receive resource requirements associated with a task;
   ascertain compute resources sufficient to execute the task on a machine in a compute farm;
   advertise the compute resources as matching the resource requirements;
   receive a request to execute the task on the machine, wherein the compute resources are controlled to execute the tasks with the identical resource requirements without further scheduling operations; and
   control the compute resources to execute the task;
   at least one reporting module to provide a global view of the compute resources to the user interface; and
   a mitigation mechanism to schedule priority tasks, the mitigation mechanism being operable to stop accepting the tasks with the identical resource requirements after a predetermined period of time to allow the lower level scheduler to schedule tasks associated with different resource requirements.

2. The system of claim 1, wherein the at least one lower level scheduler is operable to receive the plurality of tasks directly without modifications of the plurality of tasks.

3. The system of claim 1, wherein the at least one lower level scheduler is further operable to make the compute resources available in response to a demand by the upper level scheduler.

4. The system of claim 1, wherein the upper level scheduler includes a private scheduler, the private scheduler being operable to manage tasks associated with a single entity.

5. The system of claim 1, wherein the lower level scheduler includes a master scheduler process and a resource management process corresponding to each machine in the compute farm under control of the lower level scheduler.

6. The system of claim 5, wherein the compute resources matching the resource requirements are advertised by the resource management process in conjunction with a proxy task.

7. The system of claim 6, wherein the compute resources include at least one of the following: a number of central processing units and an amount of memory.

8. The system of claim 1, wherein the at least one lower level scheduler is operable to receive further tasks of the plurality of tasks via a proxy encapsulating the tasks with the identical resource requirements.

9. The system of claim 1, wherein the upper level scheduler is aware of a subset of underlying compute resources, whereas the lower level scheduler is aware of full compute resources.

10. The system of claim 1, wherein the mitigation mechanism is further operable to instruct the upper level scheduler to stop sending the tasks with the identical resource requirements after a current task is executed to allow execution of higher priority tasks.

11. The system of claim 1, wherein the at least one lower level scheduler is operable to ascertain the compute resources based on preexisting policies.

12. A method for multilayered resource scheduling, the method comprising:
   receiving, by a user interface, a plurality of tasks;
   sorting, by an upper level scheduler, the plurality of tasks into tasks with identical resource requirements;
   receiving, by at least one lower level scheduler, resource requirements associated with a task;
   ascertaining, by the at least one lower level scheduler, compute resources sufficient to execute the task on a machine in a compute farm;
   advertising, by the at least one lower level scheduler, the compute resources as matching the resource requirements;
   receiving, by the at least one lower level scheduler, a request to execute the task on the machine, wherein the compute resources are controlled to execute the tasks with the identical resource requirements without further scheduling operations;
   controlling, by the at least one lower level scheduler, the compute resources to execute the task; providing, by at least one reporting module, a global view of the compute resources to the user interface;
   receiving, by the at least one lower level scheduler, further tasks of the plurality of tasks via a proxy encapsulating the tasks with the identical resource requirements; and
   instructing, by a mitigation mechanism associated with the proxy, the upper level scheduler to stop sending the tasks with the identical resource requirements after a current task is executed to allow execution of higher priority tasks.

13. The method of claim 12, further comprising providing, by the at least one lower level scheduler, the compute resources in response to a demand by the upper level scheduler.

14. The method of claim 12, further comprising scheduling, by the mitigation mechanism associated with the proxy, priority tasks, the mitigation mechanism being operable to stop accepting the tasks with the identical resource requirements after a predetermined period of time to allow the at least one lower level scheduler to schedule tasks associated with different resource requirements.

15. The method of claim 12, further comprising managing, by the upper level scheduler, tasks associated with a single entity, the upper level scheduler including a private scheduler.

16. The method of claim 12, further comprising receiving, by the at least one lower level scheduler, the plurality of tasks directly without modifications of the plurality of tasks.

17. A system for multilayered resource scheduling, the system comprising:
  a user interface to receive a plurality of tasks;
  an upper level scheduler operable to sort the plurality of tasks into tasks with identical resource requirements;
  at least one lower level scheduler communicatively coupled to the upper level scheduler, the at least one lower level scheduler being operable to:
    receive resource requirements associated with a task;
    ascertain compute resources sufficient to execute the task on a machine in a compute farm;
    advertise the compute resources as matching the resource requirements;
    make the compute resources available in response to a demand by the upper level scheduler;
    receive a request to execute the task on the machine, wherein the compute resources are controlled to execute the tasks with the identical resource requirements without further scheduling operations; and
    control the compute resources to execute the task;
  wherein the lower level scheduler includes a master scheduler process and a resource management process corresponding to each machine in the compute farm under control of the lower level scheduler,
  wherein the compute resources matching the resource requirements are advertised by the resource management process;
  at least one reporting module to provide a global view of the compute resources to the user interface, the at least one reporting module being operable to receive, further tasks of the plurality of tasks via a proxy encapsulating the tasks with the identical resource requirements; and
  a mitigation mechanism associated with the proxy operable to instruct the upper level scheduler to stop sending the tasks with the identical resource requirements after a current task is executed to allow execution of higher priority tasks.

* * * * *